United States Patent
Pedersen et al.

(10) Patent No.: US 7,036,131 B2
(45) Date of Patent: Apr. 25, 2006

(54) PRINTING OPTICAL DISC PLAYER/RECORDER

(75) Inventors: Christen Kent Pedersen, Sunnyvale, CA (US); Thomas Herman Szolyga, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 10/382,269

(22) Filed: Mar. 5, 2003

(65) Prior Publication Data

US 2004/0174777 A1 Sep. 9, 2004

(51) Int. Cl.
G11B 17/04 (2006.01)

(52) U.S. Cl. .................................................. 720/619

(58) Field of Classification Search ............... 720/619, 720/632, 655; 369/30.76, 30.79, 30.32, 34.01; 360/92; 347/171, 222, 197, 193
See application file for complete search history.

(56) References Cited

U.S. PATENT DOCUMENTS

| | | | |
|---|---|---|---|
| 5,914,918 A * | 6/1999 | Lee et al. ................ | 369/30.32 |
| 6,148,722 A | 11/2000 | Hagstrom | |
| 6,243,345 B1 | 6/2001 | Kwang | |
| 6,265,043 B1 | 7/2001 | Vinyard et al. | |
| 6,327,230 B1 * | 12/2001 | Miller et al. ............. | 369/30.36 |
| 6,400,659 B1 * | 6/2002 | Kitaoka ................... | 369/34.01 |
| 6,481,572 B1 | 11/2002 | Wien et al. | |
| 6,760,052 B1 * | 7/2004 | Cummins et al. .......... | 347/171 |
| 6,822,932 B1 * | 11/2004 | Miller ..................... | 369/30.31 |

* cited by examiner

*Primary Examiner*—Allen Cao

(57) ABSTRACT

This disclosure provides a stand alone printing optical disc player/recorder for use in connection with CD's, DVD's, and Mini-Discs. In a particular embodiment the printing player/recorder has a combined player/recorder unit and an inkjet printer. Using a platter transport the printer player/recorder is capable of reading or writing information to a provided optical disc and then printing a label upon the optical disc without removing the disc from the system. The label printed may also be generated from the information read from or written to the optical disc itself thereby insuring a match between the label and the information encoded upon the optical disc. Associated methods of use are also provided.

26 Claims, 3 Drawing Sheets

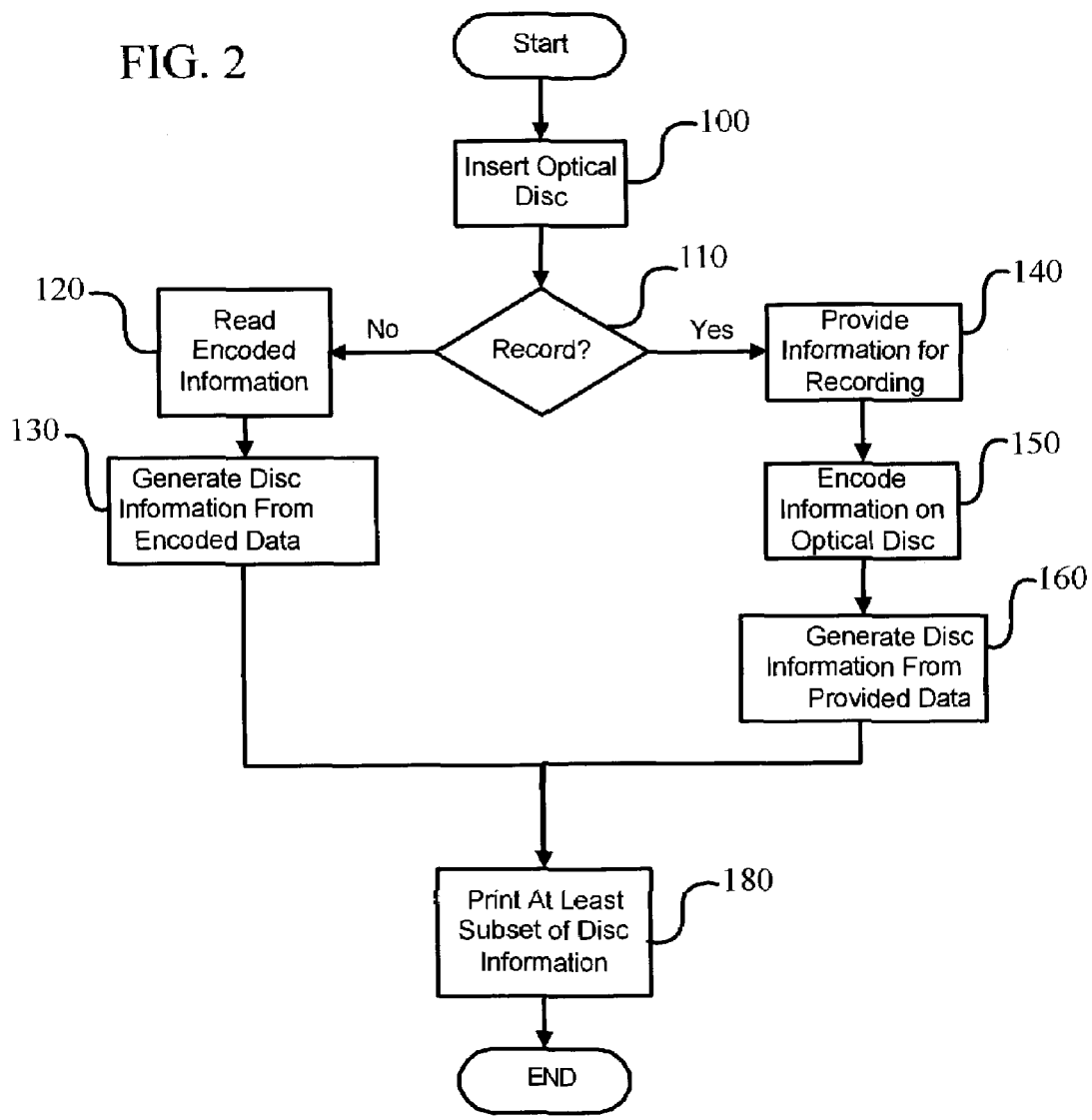

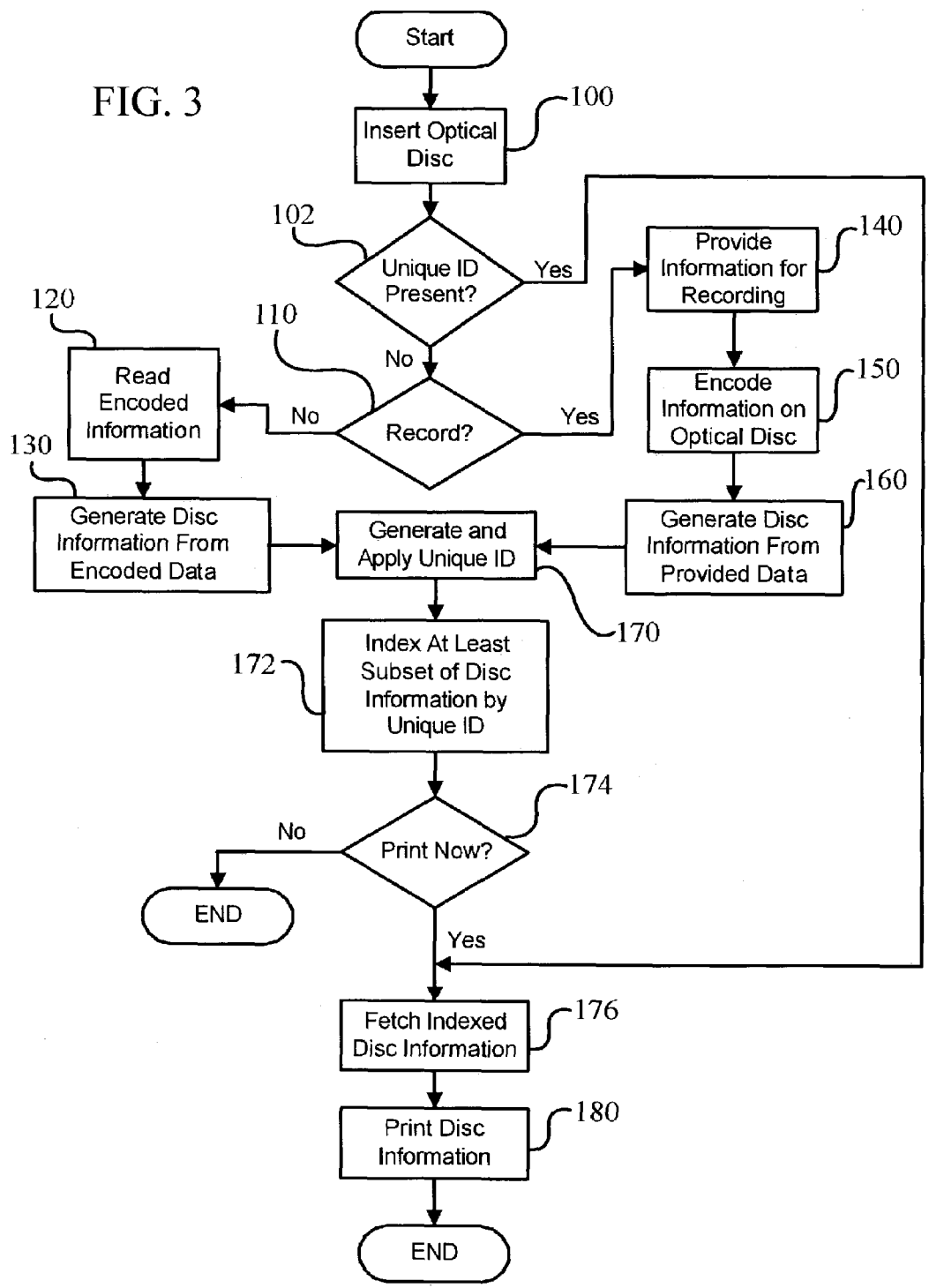

PRINTING OPTICAL DISC PLAYER/RECORDER

FIELD OF THE INVENTION

The present invention relates to optical disc printer player/recorders, and in particular to a self-contained unit capable of reading from and recording to the optical disc and printing visual information upon the optical disc, and more particularly to generating the visual information based upon the information encoded upon the disc.

BACKGROUND OF THE INVENTION

Optical discs, for example CDs, DVD's and Mini-Disc's are commonly used media for storing data of all types including music, video, multimedia and software. Recordable optical discs commonly known as Recordable CDs (CR-Rs), Re-Writeable CDs (CD-RW), DVD-Rs, DVD-RWs, DVD+Rs, DVD+RWs, and Recordable Mini-Discs are commonly available to individuals. As technology has advanced and the popularity of personal computers has increased, many individuals now enjoy creating their own CDs, DVDs and Mini-Discs.

In general, as the manufacturers of recordable optical discs cannot anticipate what specific data the end user will choose to record, recordable optical discs are void of unique labels or printing that would permit a user to distinguish one recorded disc from another. To avoid confusion the user must write on or label the disc.

Although handwriting upon the disc is a common practice, it generally makes the disc appear to be of poor quality. To provide more pleasing identifying indicia, the user may employ the use of a computer application to create a data structure for a label comprising words and or images. Such a process is both time consuming and subject to human errors such as misspelling.

Regardless of the user's artistic talent and associated frustrations with the labeling software, the options currently available to the user to create a physical visual label are limited and problematic. In one popular method, the software generated information is printed upon a sheet containing a special die-cut adhesive label. After printing, the label must be manually applied to the optical disc. Special tools, gigs, and even removable paper guides have been developed to assist with the process of attempting to properly apply the label to the optical disc. Misapplication of the label is quite common. A paper label may become misaligned, folded, or torn. With a translucent plastic label it is often difficult to apply the label without capturing air bubbles under the label. These labeling problems may result in a range of outcomes from an optical disc that is unusable to an optical disc that is viewed as poor quality.

Devices such as printing trays to hold optical discs for printing and specialized printers for printing to an optical disc have recently been brought to market to address many of the problems with the manual label process.

However, whether using the adhesive label method or direct printing method, the user must remove the optical disc from the recorder to complete the labeling process. This act introduces vulnerabilities to the disc identifying process. Most notable of these is the very real chance that the label will not be applied to the intended disc. If the user is making many discs, has for some reason a number of unlabeled discs, or does not complete the labeling process while the identity of the disc is clear, the disc may be mislabeled.

In the event of confusion over the identity of an optical disc, the user can return the disc to a player or player/recorder and view the contents. Such a process may require that the user review multiple unlabeled discs in the search for the desired one—a potentially arduous and time consuming task. Upon identifying the desired unlabeled disc, if the user does not proceed with the labeling process the opportunity for confusion will arise again.

Hence, there is a need for an optical disc printer assembly that overcomes one or more of the drawbacks identified above. The present invention satisfies one or more of these needs.

SUMMARY OF THE INVENTION

The invention provides a printing optical disc player/recorder system and related method of use for printing identifying indicia upon the disc.

In particular, and by way of example only, according to an embodiment of the present invention, this invention provides an optical disc player/recorder system comprising: a case; at least one motor mounted within the case; an optical disc transport mounted within the case and actuated by at least one motor; at least one optical disc read/write device mounted within the case and proximate to the transport to read/write information upon an optical disc provided by the transport; and at least one printer mounted within the case and proximate to the transport to print identifying indicia upon an optical disc provided by the transport.

Moreover, according to an embodiment thereof, the invention may provide a method of printing identifying indicia upon an optical disc in a optical disc printer system, comprising: inserting an optical disc into the printer system; reading encoded data information from the optical disc; generating disc information from the encoded data information; and printing at least a subset of the disc information to the optical disc.

In another embodiment, the invention may provide a method of recording an optical disc and printing identifying indicia upon that optical disc in a optical disc printer and recorder system, comprising: inserting a recordable optical disc into the printer and recorder system; providing media for recording upon the optical disc; encoding the media upon the recordable optical disc; generating disc information from the provided media; and printing at least a subset of the disc information to the recordable optical disc.

These and other features and advantages of the preferred apparatus and method will become apparent from the following detailed description taken in conjunction with the accompanying drawings which illustrate, by way of example the principles of the invention.

BRIEF DESCRIPTION OF THE DRAWINGS

FIG. 2 is a flow diagram illustrating operation of a printing optical disc player/recorder according to an embodiment of the present invention.

FIG. 3 is a flow diagram illustrating operation of a printing optical disc player/recorder employing the use of unique identifiers according to an embodiment of the present invention.

DETAILED DESCRIPTION

Figure 1:
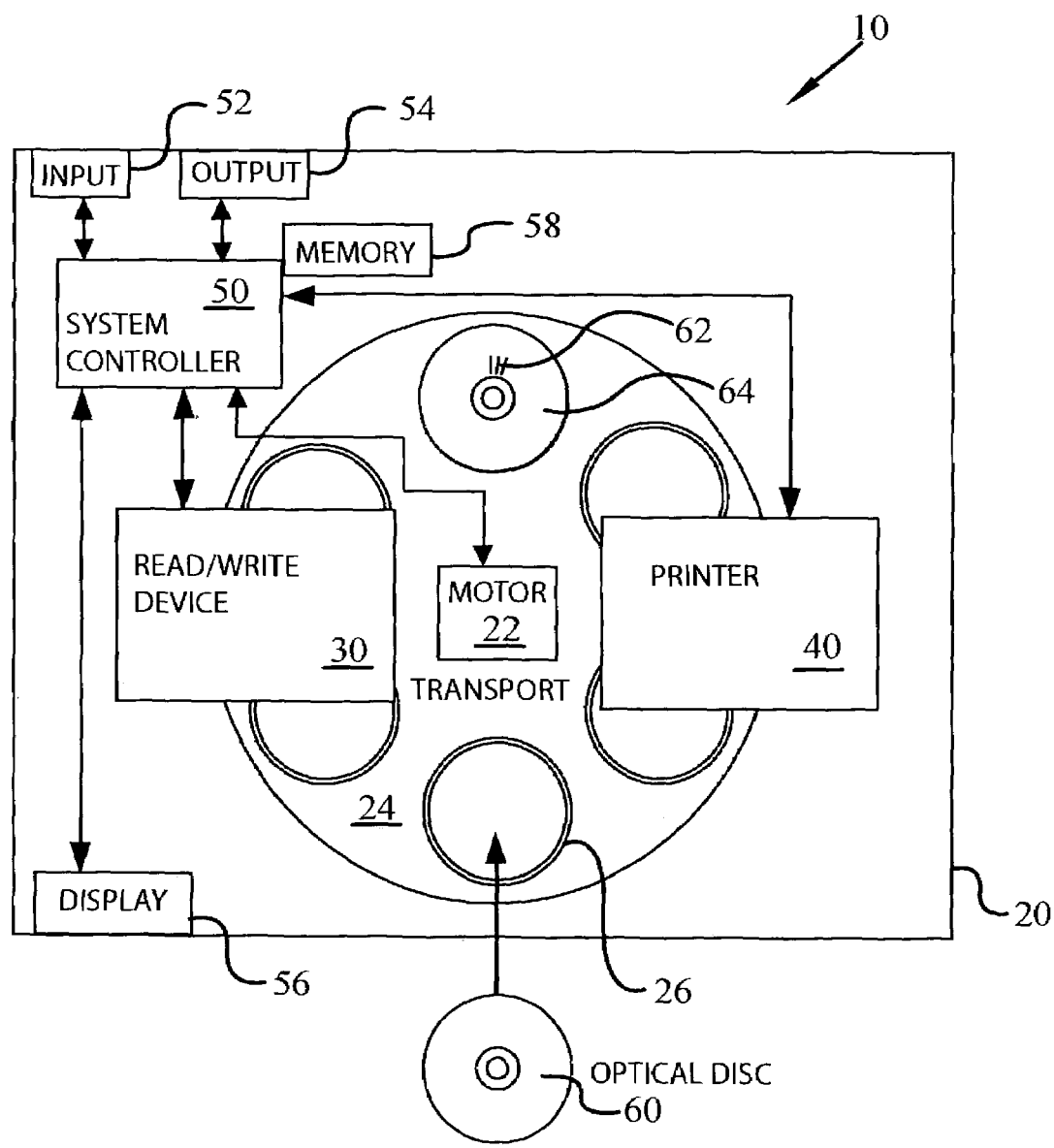
FIG. 1 is a schematic block diagram of a printing optical disc player/recorder according to an embodiment of the present invention.

Before proceeding with the detailed description, it is to be appreciated that the present invention is not limited to use or application in conjunction with a specific type of optical disc player, recorder or printer. Thus, although the present invention is, for the convenience of explanation, depicted and described with respect to a typical combined optical read/write device and inkjet printer, it will be appreciated that this invention may be applied with other types of optical read and write devices, combined or separated, and with other types of printers.

FIG. 1 shows a block diagram of a stand alone printing optical disc player/recorder system 10 according to an embodiment of the present invention. It is to be understood and appreciated that the optical disc 60 can be one of the optical disk formats among a compact disc (CD), a Mini-Disc (MD), a digital video disc (DVD), or other type of disc used for the storage of digital information, and can be recordable.

The printing optical disc player/recorder 10 has a case 20 enclosing a motor 22, an optical disc transport 24, at least one optical disc read/write device 30, at least one printer 40, and a system controller 50. The motor 22 can be coupled to the transport 24, serving to actuate the transport to receive an optical disc 60 in an appropriate receiver 26. The received optical disk 60 is provided by the transport 24 in turn to the read/write device 30 and printer 40, which are proximately located to the transport 24. That the received optical disk 60 is provided in turn, as in first to the read/write device 30 and then secondly to the printer 40 the printing optical disc player/recorder 10 advantageously avoids opportunity for mislabeling of the optical disc 60. This advantageous method is more fully discussed below.

Under appropriate circumstances transport 24 may spin the optical disc as it is presented to the read/write device 30 and printer 40. In at least one embodiment, the printer 40 and read/write device 30 may be a combined unit such that transport 24 may spin optical disc 60, but transport 24 may not be required to move optical disc 60 from one location to another within the printing optical disc player/recorder 10. In such embodiments, the read/write process is still performed first so as to insure that proper labeling of the optical disk 60 occurs.

More specifically, the transport 24 may be a multi-disc platter (shown) or a carousel holder (not shown) capable of moving the optical disc from one location to another within the case 20. Inexpensive, readily available and durable, the disc platter or carousel holder permits use of currently available read/write device 30 and printer 40 without undue modification or interference of components.

In at least one embodiment, the read/write device 30 can be a combined read/write recorder, such as a commonly available combined read write CD/DVD recorder. A typical read/write recorder is understood to have at least a disc drive spindle motor, an optical pickup and encoder assembly, a tracking mechanism to move the pickup and write assembly across the encoded data region of the optical disc, an input device to receive information for writing to the optical disc, and output device to provide information read from the optical disc.

It is understood and appreciated that, in general optical disc's such as CD's and DVD's store digital information, represented by a series of 1s and 0s, in a spiral track originating at the center of the optical disc. To read this information, a laser beam is passed in line with the track. When laser light is reflected back to an optical sensor a 1 is interpreted, when it is deflected a 0 is interpreted. A write operation is accomplished with a more powerful laser which if engaged on recordable media will alter the surface and thereby encode a 0. A re-write operation is similarly achieved using an intermediate power erase laser and a phase change compound layer within the optical disc.

Under appropriate circumstances the read/write device 30 may also include the traditional components of an information encoder/decoder, such as a digital-analog and analog-digital converter, and microprocessor to provide an output stream of data regarding the contents of the optical disc 60, for example a table of contents, to the printer 40. Moreover, it is to be understood and appreciated that what the printer 40 provides upon the optical disc 60 is a direct result of what the read/write device 30 determines to be on the optical disc 60.

In at least one embodiment, the printer 40 can be an inkjet printer. A typical inkjet printer is understood to operate with the commonly available components of a print head assembly, ink cartridges, print head stepper motor, drive belt, stabilizer bar, and controlling circuitry. It is further understood and appreciated that, in general, an ink jet printer operates by precisely passing a print head back and forth over an advancing surface to which tiny droplets of ink are applied. Multiple passes over the same area permits a blending of primary colors and thus a spectrum of colors can be achieved.

When partnered with a print receiving surface that has been prepared to accept ink from an ink-jet printer without bleeding, high resolution photographic quality images can be produced inexpensively and effectively. In at least one embodiment the printer 40 is a color ink jet printer. Other methods of printing may be used, such as, but not limited to, solid ink, dye-sublimation, thermal transfer, and laser. As inkjet printer components are small, inexpensive and readily available, use of an inkjet printer permits the printing optical disc player/recorder 10 to produce properly placed, high quality and visually appealing label directly upon the optical disc.

The identifying indicia printed upon the optical disc 60 by printer 40 can be at least a subset of the information read from, or written to, the optical disc 60 by the read/write device 30. By way of example, the subset of information read from or written to the optical disc 60 could be the table of contents for optical disc 60. The identifying indicia printed upon the optical disc 60 by printer 40 may also include additional information provided specifically for printing purposes, such as a graphic image.

As shown, in at least one embodiment a system controller 50 is present and coupled to the motor 22, read/write device 30, and printer 40 to assume their control and direct their operation. The system controller 50 is further connected to at least one information input device 52, such as audio, video and or data inputs, and more specifically analog and digital audio/video inputs and at least one computer network interface. In addition, the system controller 50 is also connected to at least one information output device 54, such as audio and video outputs, and more specifically analog and digital audio and video outputs. Under appropriate circumstances, additional input/output devices such as a computer network port, USB port, serial port, or other similarly appropriate devices may also be provided.

The at least one input and output devices, 52 and 54, permit the user of the printing optical disc player/recorder 10 to receive information read from the optical disc 60, and to provide information for writing to and or printing upon the optical disc 60. In at least one embodiment, the printing optical disc player/recorder 10 may receive information, for writing and or printing upon the optical disc 60, via a computer network. In at least one embodiment, the system controller can also be connected to an output device, such as an output display 56, to provide visual system information to the user. Under appropriate circumstances, additional system controls such as function buttons and a remote control may be added to permit the system user to further influence the operation of the system controller 50.

Coupled to the system controller 50 is a memory 58 serving to provide the system controller 50 with controlling software, more specifically encoding, decoding and printing software. In addition, the memory 58 provides data storage for information read from, to be written to, or printed upon an optical disc 60. In at least one embodiment, the memory is RAM and/or ROM memory and under appropriate circumstances may incorporate the use of a mass storage device such as a hard drive.

To assist with proper labeling of the optical disc 60, the printing optical disc player/recorder 10 may employ the use of unique identifiers, applied by a unique identifier device, to uniquely identify each optical disc 60 received by the transport 24 for printing. In an embodiment, the unique identifier device may be the read/write device 30. More specifically, the read/write device 30 may add a unique identifier 62 to each optical disc 64 written by the read/write device 30, for example as a non-disruptive data byte in the optical disc's index track. Under appropriate circumstances, such as to identify non-recordable optical discs, the unique identifier 62 may be applied as a bar code by a bar coding device, or other similarly appropriate identifier and device.

When employing a unique identifier 62, information relating to the optical disc 64 is tied to the unique identifier 62. More specifically, the subset of information read or written to the optical disc 64 that is intended to be printed upon the optical disc is indexed in memory 58 according to the unique identifier 62. In addition, the information indexed in memory 58 according to unique identifier 62 may include additional information, such as graphics, supplied by the user for printing upon uniquely identified optical disc 64. Under appropriate circumstances, the information indexed by unique identifier 64 may be stored in a memory removed from the printing optical disc player/recorder 10, but accessible through input and output devices, 52 and 54.

Such indexing is desirable for it permits the user of the printing optical disc player/recorder 10 to record an optical disc and remove it from the printing optical disc player/recorder 10 without risk of confusion with other unlabeled optical discs. Upon return to the printing optical disc player/recorder 10, for example after a fresh ink cartridge has been acquired and inserted, the optical disc 64 will be recognized by it's unique identifier 62. Based on such recognition, the printer 40 is directed to print the proper identifying indicia by the system controller 50 indexing the unique identifier 62 to the correct subset of information held in memory 58. Moreover, the printing optical disc player/recorder 10 advantageously eliminates the prospect of mislabeling a disc as the printing optical disc player/recorder 10 reads the data written to the disc and/or the unique identifier 62 so as to provide automatically provide the proper identifying indicia upon the disc 64.

Having described the above physical embodiment of an printing optical disc player/recorder 10, another embodiment relating to the method of operating a printing optical disc player/recorder 10 will now be described with reference to FIG. 1 and the flow chart of FIG. 2. It will be appreciated that the described method need not be performed in the order in which it is herein described, but that this description is merely exemplary of one method of using a printing optical disc player/recorder 10 in accordance with the present invention.

When a user has an optical disc that he wishes to label he or she initiates the process by inserting the optical disc 60 into the printing optical disc player/recorder 10, as is represented by process 100. The optical disc 60 is evaluated by the printing optical disc player/recorder 10 to determine if the optical disc is recordable, as represented by decision 110. More specifically the transport 24 is activated by the motor 22 such that the optical disc 60 is presented to the read/write device 30. Determining the recordable status of optical media is understood and appreciated to be within the abilities of a typical read/write recorder as describe above.

In the first case the optical disc 60 is not recordable. The read/write device 30 reads the encoded data information, represented by process 120. The system controller 50 receives the output of data from the read/write device 30 and generates corresponding disc information, such as for example a table of contents, represented by process 130. The disc information, specifically at least a subset of the disc information, is then printed upon the optical disc 60, as represented by process 180. More specifically, transport 24 is activated by motor 22 such that optical disc 60 is presented to printer 40. The system controller 50 provides at least a subset of the disc information and relevant printing instructions to the printer 40. The subset of disk information is then printed as identifying indicia upon optical disc 60 by printer 40. This advantageously allows the printing optical disc player/recorder 10 user to label his or her optical discs quickly and effectively, without an opportunity for the wrong label to be applied.

In the event that the optical disc 60 provided by the user is recordable the method proceeds as above through decision 110. The user then provides information for recording as represented by process 140. More specifically, the user supplies information, such as audio, video or computer data information, to system controller 50 through input device 52. In addition, under appropriate circumstances the user may supply additional information, such as graphics, to be held memory 58 for later printing upon optical disc 60.

Utilizing the encoding/decoding software provided by memory 58, the system controller 50 converts the provided information for encoding upon the optical disc 60 if such conversion is necessary. The information is then provided to the read/write device 30 for encoding upon the optical disc 60, as represented by process 150. In at least one embodiment, concurrent with receiving the provided information and providing it to the read/write device 30, the system controller 50 generates at least a subset of the disc information, as represented by process 160. The method then continues to the print process 180 as described above.

Moreover, as the identifying indicia printed upon the optical disc 60 is an automatically generated subset of the information upon the optical disc 60, accidental mislabeling is advantageously avoided. Even if the user interrupts the process before printing has occurred, upon returning the optical disc 60 to the printing optical disc player/recorder 10, the printing optical disc player/recorder 10 will automatically read from the optical disc 60 to produce a subset of disc information for printing upon the optical disc 60.

As described above, in at least one embodiment, the printing optical disc player/recorder 10 employs the use of unique identifiers to insure that the identifying indicia printed upon optical disc 60 properly corresponds to the encoded information of optical disc 60.

A method of operating a printing optical disc player/recorder 10 employing unique identifiers is now described with reference to FIG. 1 and the flow chart FIG. 3. It will be appreciated that the described method need not be performed in the order in which it is herein described, but that this description is merely exemplary of one method of using a printing optical disc player/recorder 10 in accordance with the present invention.

With respect to FIG. 3 it will be noted that many of the represented processes are identical to the processes presented and described with respect to FIG. 2. To facilitate understanding, these processes have been identically numbered.

Starting as above, the user inserts optical disc 60 into the printing optical disc player/recorder 10, as represented by process 100. Optical disc 60 is evaluated by the printing optical disc player/recorder 10 to determine if the optical disc has a unique identifier, as represented by decision 102. More specifically, the transport 24 is activated by the motor 22 such that optical disc 60 is presented to read/write device 30. In at least one embodiment, the unique identifier 62 is encoded such that it is detectable by the read/write device 30. Under appropriate circumstances alternative detection methods such as bar code scanning or other suitable methods may be employed.

If a unique identifier 62 is present, for example disc ID #28088, the system controller 50 directs the motor to actuate the transport to present optical disc 64 to printer 40. The system controller accesses memory 58 to retrieve at least a subset of the disc information as indexed by unique identifier 62, represented by process 176. The method then continues to the print process 180 as described above.

If a unique identifier 62 is not found to be present on optical disc 60, the method continues through decision 110 and processes 120~130, or 140~160 as described above.

In addition to these processes, the printing optical disc player/recorder 10 provides a unique identifier 62, for example disc ID #20274, to achieve uniquely identified optical disc 64, as represented by process 170. In an embodiment, the unique identifier 62 is encoded and applied by the read/write device 30. Under appropriate circumstances alternative application methods such as a bar code applicator or other suitable methods may be employed. Under appropriate circumstances the unique identifier 62 may be generated and encoded contemporaneously with the process of encoding the media upon a recordable optical disc.

At least a subset of the generated disc information is indexed in memory 58 according to unique identifier 62, as represented by process 172. The uniquely identified optical disc 64 may now be removed from the printing optical disc player/recorder 10 should the operator desire to print at a later date, for example after obtaining a new print cartridge, as represented by decision 174. The ability to remove the optical disc is significant. To the operator's eye there may be no visual distinction between uniquely identified disc #20274 and uniquely identified disc #28088, a factor that traditionally has permitted mislabeling to occur. Upon return to the printing optical disc player/recorder 10, the unique identifier 62 will be recognized as discussed above with reference to decision 102, and the proper identifying indicia will be printed. The use of unique identifiers 62 advantageously insures that disc labels are not applied to the wrong disc.

If the optical disc 64 is not removed from the printing optical disc player/recorder 10 the method continues directly to the retrieve at least a subset of the disc information as indexed by unique identifier 62, represented by process 176. The method then continues to the print process 180 as described above.

While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

We claim:

1. A printing optical disc player and recorder system to prevent accidental mislabeling of optical discs; comprising:
   a case;
   at least one motor mounted within the case;
   at least one optical disc read and write device mounted within the case to read and write information upon an optical disc; and
   at least one printer mounted within the case to print identifying indicia upon an optical disc;
   an optical disc transport mounted within the case and actuated by the at least one motor to present at lease one optical disc to the read and write device and the printer;
   wherein the identifying indicia printed to each optical disc is at least a subset of information read from or written to the optical disc such that accidental mislabeling is prevented.

2. The printing optical disc player and recorder of claim 1, further comprising a unique identifier device providing a unique identifier to each optical disc received by the transport.

3. The printing optical disc player and recorder of claim 2, wherein the unique identifier ties to at least a subset of information read from or written to the optical disc.

4. The printing optical disc player and recorder of claim 3, wherein the unique identifier determines the identifying indicia to be printed upon the optical disc.

5. The printing optical disc player and recorder of claim 1, wherein the at least one read and write device is a combined optical disc read and write recorder.

6. The printing optical disc player and recorder of claim 1, wherein the at least one printer is selected from the group consisting of an ink-jet printer, a thermal transfer printer, a laser printer, and combinations thereof.

7. The printing optical disc player and recorder of claim 1, wherein the transport is a multi-disc platter.

8. The printing optical disc player and recorder of claim 1, wherein the transport is a carousel holder.

9. The printing optical disc player and recorder of claim 1, wherein the at least one read and write device and printer are a combined device.

10. The printing optical disc player and recorder of claim 1, wherein the identifying indicia is automatically generated from the subset of information read from or written to the optical disc while the optical disc is within the printing optical disc player and recorder system so that accidental mislabeling is prevented.

11. A printing optical disc player and recorder system to prevent accidental mislabeling of optical discs; comprising:
a case;
at least one optical disc read and write device mounted within the case to read and write information upon an optical disc;
at least one printer within the case to print identifying indicia upon an optical disc;
an optical disc transport mounted within the case and actuated by at least one motor; and
a system controller coupled to the read and write device, the printer and the transport, the controller either:
operating the transport and the read and write device to read at least a subset of information from an optical disc and then operating the transport and the printer to print identifying indicia, based upon the information read from the optical disc, upon the optical disc; or
operating the read and write device to write information to an optical disc and then operating the printer to print identifying indicia, the identifying indicia generated by the system controller before the optical disc is removed from the system and based upon at least a subset of the information written to the optical disc, upon the optical disc;
wherein the operation of the controller prevents accidental mislabeling of the optical disc.

12. The printing optical disc player and recorder of claim 11, further comprising a unique identifier device providing a unique identifier to each optical disc received by the transport.

13. The printing optical disc player and recorder of claim 12, wherein the unique identifier ties to at least a subset of information read from or written to the optical disc.

14. The printing optical disc player and recorder of claim 13, wherein the unique identifier determines the identifying indicia to be printed upon the optical disc.

15. The printing optical disc player and recorder of claim 11, wherein the at least one printer is selected from the group consisting of an ink-jet printer, a thermal transfer printer, a laser printer, and combinations thereof.

16. The printing optical disc player and recorder of claim 11, wherein the identifying indicia is automatically generated from the subset of information read from or written to the optical disc while the optical disc is within the printing optical disc player and recorder system so that accidental mislabeling is prevented.

17. A printing optical disc player and system to prevent accidental mislabeling of optical discs; comprising:
a case;
transport means for transporting an optical disc within the case;
drive means for spinning the optical disc presented by the transport means;
optical read means for reading the optical disc spun by the drive means;
optical encoding means for writing to the optical disc spun by the drive means;
processing means for processing the optical disc read and write information, the processing means generating virtual indicia based upon the optical disc information;
printer means for printing the virtual indicia as generated by the processing means; and
a tracking means to track the optical disc and ensure that the virtual indicia based upon the optical disc information is printed to the optical disc from which it was read, the tracking means thereby preventing accidental mislabeling of the optical disc.

18. A method of printing identifying indicia upon an optical disc in a printing optical disc player and recorder system to prevent accidental mislabeling of optical discs; comprising:
inserting an optical disc into the printing optical disc player and recorder system;
reading encoded data information from the optical disc;
generating disc information from the encoded data information while the optical disc is within the printing optical disc player and recorder system; and
printing at least a subset of the disc information to the optical disc before the disc is removed from the system, thereby preventing accidental mislabeling of the optical disc.

19. The method of claim 18, wherein the printing of at least a subset of the disc information is accomplished by an ink jet printer.

20. The method of claim 18, further comprising generating a unique identifier for the optical disc and indexing at least a subset of the disc information in a memory based upon the unique identifier.

21. The method of claim 20, wherein printing at least a subset of the disc information is accomplished by referencing the unique identifier to the memory.

22. A method of recording an optical disc and printing identifying indicia upon that optical disc in a printing optical disc player and recorder system to prevent accidental mislabeling of optical discs; comprising:
inserting a recordable optical disc into the printing optical disc player and recorder system;
providing media for recording upon the optical disc;
encoding the media upon the recordable optical disc;
generating disc information from the provided media while the optical disc is within the printing optical disc player and recorder system; and
prior to removing the optical disc from within the system, printing at least a subset of the disc information to the recordable optical disc, thereby preventing accidental mislabeling of the optical disc.

23. The method of claim 22, wherein the printing of at least a subset of the disc information is accomplished by an ink jet printer.

24. The method of claim 22, wherein the generating of the disc information is accomplished by a system controller coupled to a memory containing encoding software directing the operation of the system controller.

25. The method of claim 24, further comprising generating a unique identifier for the recordable optical disc and indexing at least a subset of the disc information in the memory based upon the unique identifier.

26. The method of claim 25, wherein printing at least a subset of the disc information is accomplished by referencing the unique identifier to the memory.

* * * * *